(12) United States Patent
Seneker et al.

(10) Patent No.: US 9,321,935 B2
(45) Date of Patent: Apr. 26, 2016

(54) CONTAINER COATING COMPOSITIONS

(71) Applicant: PPG INDUSTRIES OHIO, INC., Cleveland, OH (US)

(72) Inventors: Carl Seneker, Milford, OH (US);
Jessica Williamson, Wilder, KY (US);
Claudia Knotts, Cincinnati, OH (US);
Youssef Moussa, Loveland, OH (US)

(73) Assignee: PPG Industries Ohio, Inc., Cleveland, OH (US)

(*) Notice: Subject to any disclaimer, the term of this patent is extended or adjusted under 35 U.S.C. 154(b) by 368 days.

(21) Appl. No.: 13/923,404

(22) Filed: Jun. 21, 2013

(65) Prior Publication Data

US 2013/0280453 A1   Oct. 24, 2013

Related U.S. Application Data

(63) Continuation-in-part of application No. 13/113,130, filed on May 23, 2011.

(51) Int. Cl.
*C09D 167/02* (2006.01)
*C08G 63/692* (2006.01)
*C08G 63/54* (2006.01)
*C09D 167/06* (2006.01)

(52) U.S. Cl.
CPC ............. *C09D 167/02* (2013.01); *C08G 63/54* (2013.01); *C08G 63/6928* (2013.01); *C09D 167/06* (2013.01); *Y10T 428/1352* (2015.01); *Y10T 428/31786* (2015.04)

(58) Field of Classification Search
CPC ............... Y10T 428/1352; Y10T 428/31786; C09D 167/02; C09D 167/06; C09D 201/00; C08L 85/02; C08L 2666/18; C08L 61/20; C08L 61/04; C08G 63/54; C08G 63/6928
USPC ............... 428/35.7, 480; 524/539, 604, 605
See application file for complete search history.

(56) References Cited

U.S. PATENT DOCUMENTS

| | | | |
|---|---|---|---|
| 4,181,638 A * | 1/1980 | Lasher | 525/167.5 |
| 5,306,567 A * | 4/1994 | Kuo et al. | 428/482 |
| 5,739,215 A * | 4/1998 | Westerhof et al. | 525/438 |
| 6,235,102 B1 | 5/2001 | Parekh et al. | |
| 6,420,040 B1 | 7/2002 | Seibel et al. | |
| 6,472,480 B1 | 10/2002 | Anderson | |
| 6,525,165 B1 | 2/2003 | Tsukamoto et al. | |
| 6,576,343 B2 | 6/2003 | Parekh et al. | |
| 6,730,361 B2 | 5/2004 | Parekh et al. | |
| 7,198,849 B2 | 4/2007 | Stapperfenne et al. | |
| 8,367,171 B2 | 2/2013 | Stenson et al. | |
| 2007/0260003 A1 * | 11/2007 | Cinoman et al. | 524/439 |
| 2010/0260954 A1 | 10/2010 | Stenson et al. | |
| 2011/0290696 A1 | 12/2011 | Stenson et al. | |
| 2013/0280455 A1 | 10/2013 | Evans et al. | |
| 2013/0316109 A1 | 11/2013 | Niederst et al. | |

FOREIGN PATENT DOCUMENTS

| | | | | |
|---|---|---|---|---|
| EP | 1273626 A1 | 1/2003 | | |
| EP | 1964898 A1 | 9/2008 | | |
| WO | WO 02/072664 | * | 9/2002 | ........... C08G 63/692 |
| WO | WO 2011/130671 A2 | 10/2011 | | |
| WO | WO 2012/161758 A2 | 11/2012 | | |
| WO | WO 2013/145992 A1 | 10/2013 | | |

* cited by examiner

*Primary Examiner* — Gwendolyn Blackwell
*Assistant Examiner* — Kevin Ortman, Jr.
(74) *Attorney, Agent, or Firm* — William J. Uhl

(57) ABSTRACT

A coating composition comprising a polyester resin binder and a phosphatized polyester. The compositions are useful for coating containers such as food and beverage containers. The compositions have excellent hydrolytic stability upon storage at high temperature. The compositions are formulated to be substantially free of bisphenol A (BPA) and bisphenol A diglycidyl ether (BADGE).

18 Claims, No Drawings

CONTAINER COATING COMPOSITIONS

CROSS-REFERENCE TO RELATED APPLICATIONS

This application is a continuation-in-part of application Ser. No. 13/113,130, filed May 23, 2011.

FIELD OF THE INVENTION

The present invention relates to container coating compositions based on polyester resins.

BACKGROUND OF THE INVENTION

A wide variety of coatings have been used to coat the surfaces of food and beverage containers. For example, metal cans are sometimes coated using coil coating or sheet coating operations, that is, a coil or sheet of steel or aluminum, is coated with a suitable composition and cured. The coated substrate is then formed into the can body or can end. Alternatively, the coating composition may be applied, for example, by spraying and dipping, to the formed can and then cured. Coatings for food and beverage containers should preferably be capable of high speed application to the substrate and provide the necessary properties when cured to perform in a demanding end use environment. For example, the coating should be safe for food contact and have excellent adhesion to the substrate.

Many of the coating compositions for food and beverage containers are based on epoxy resins that are the polyglycidyl ethers of bisphenol A. Bisphenol A in container coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans. These compounds are nevertheless perceived by some as being harmful to human health. Consequently, there is a strong desire to eliminate these compounds from coatings for food and beverage containers. Accordingly, what are desired are container coating compositions for food and beverage containers that do not contain extractable quantities of BPA, BADGE or other derivatives of SPA and yet have commercially acceptable properties.

Hydroxyl functional polyesters curable with aminoplast or phenolplast curing agents provide suitable container coating compositions. However, such compositions can exhibit poor hydrolytic stability when stored at high humidity, thereby limiting their commercial applicability. It would be desirable to formulate a container coating composition with a polyester resin binder that has improved hydrolytic stability when stored at high humidity.

SUMMARY OF THE INVENTION

The present invention provides a coating composition for application to the surface of a food or beverage container or a portion thereof comprising:
(A) 70 to 90 percent by weight of a hydroxyl functional polyester resin prepared from:
  (i) 0.1 to 8 mole percent of an alpha, beta-ethylenically unsaturated dicarboxylic acid containing from 4 to 5 carbon atoms,
  (ii) 10 to 30 mole percent of naphthalene dicarboxylic acid including lower alkyl esters thereof,
  (iii) 10 to 30 mole percent of an aromatic dicarboxylic acid different from (ii),
  (iv) 40 to 60 mole percent of an aliphatic did containing branched alkyl groups, and
  (v) 0.2 to 4 mole percent of a trial,
  the mole percentages being based on total moles of (i)-(v);
(B) 5 to 25 percent by weight of an aminoplast curing agent,
the percentages by weight of (A) and (B) being based on weight of resin solids in the coating composition.

The coating composition can contain from 0.1 to 20, such as 0.8 to 12, for example 3 to 12 percent by weight based on weight of resin solids of a phosphated polyester to optimize the properties such as adhesion of the resultant coating.

The compositions of the invention have improved hydrolytic stability when stored at high humidity.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

As used herein, "a" and "the at least one" and "one or more" are used interchangeably. Thus, for example, a coating composition that comprises "a" polymer can be interpreted to mean the coating composition includes "one or more" polymers.

As used herein, the molecular weights are determined by gel permeation chromatography using a polystyrene standard. Unless otherwise indicated, molecular weights are on a number average basis (Mn).

The polyester resins suitable in the practice of the invention can have number average molecular weights (Mn) of 9,000 to 16,000, such as 10,000 to 15,000 g/mole. Molecular weights less than 9,000 result in coatings with deficient high temperature humidity resistance; whereas molecular weights greater than 16,000 are difficult to prepare in standard commercial size reactors. The polyester resin useful in the practice of the invention is hydroxyl functional, although the hydroxyl number is typically less than 15 such as from 0.5 to 12 milligrams of KOH per grams of polyester resin solids because of its high molecular weight.

Suitable polyester resins are typically prepared by condensation (esterification) according to known processes [see, for example, Zeno Wicks, Jr., Frank N. Jones and S. Peter Pappas,

*Organic Coatings: Science and Technology*, Vol. 1, pp. 122-132 (John Wiley & Sons: New York, 1992)]. The polyester resin is prepared from:

(i) 1 to 8 mole percent of an alpha, beta-ethylenically unsaturated dicarboxylic acid containing from 4 to 5 carbon atoms, (ii) 10 to 30 mole percent of naphthalene dicarboxylic acid including lower alkyl esters thereof, (iii) 10 to 30 mole percent of an aromatic dicarboxylic acid different from (ii), (iv) 40 to 60 mole percent of an aliphatic diol containing branched alkyl groups, and (v) 0.2 to 4 mole percent of a triol, the mole percentages being based on total moles of (i)-(v);

Among the alpha, beta-ethylenically unsaturated dicarboxylic acids that can be used are maleic acid, fumaric acid, itaconic acid, crotonic acid and citriconic acid. The presence of alpha, beta-ethylenically unsaturated dicarboxylic acids, particularly maleic acid, results in coatings with improved cure response as evidenced by blush resistance. Amounts less than 1 mole percent do not evidence sufficient improved cure response; whereas amounts greater than 8 mole present result in soft films that will not withstand the high temperatures of the can and can end manufacturing process.

The naphthalene dicarboxylic acids, particularly the dimethyl ester thereof, is essential for hydrolytic stability when the coating compositions are stored at high humidity. Amounts less than 10 mole percent result in insufficient resistance to high temperature humidity conditions; whereas amounts greater than 30 mole percent result in crystalline polyesters giving mottled films with inferior properties.

Examples of the different aromatic dicarboxylic acids are isophthalic acid and terephthalic acid. These dicarboxylic acids in the amounts specified reduce the tendency of the polyester to crystallize.

Examples of aliphatic diols containing alkyl branching are 2-methyl-1,3-propanediol and 2-butyl-2-ethyl-1,3-propanediol. These diols in the amounts specified reduce the tendency of the polyester to crystallize.

Examples of trials are trimethylolpropane and trimethylolethane. The presence of trials in the amounts specified provide for better chemical resistance and the right blend of hardness and flexibility in the cured coating needed in the can manufacturing process.

Optionally, the polyester resin may be prepared with up to 15 mole percent of a saturated aliphatic dicarboxylic acid containing from 4 to 12 carbon atoms, such as adipic acid and sebacic acid. Other optional reactants are up to 5 mole percent of a cycloaliphatic diol, such as cyclohexane dimethanol, and up to 15 more percent of a linear diol, such as ethylene glycol and 1,4-butanediol.

The polyester resin is present in the coating composition in amounts of 70 to 90, such as 80 to 90 percent by weight based on weight of resin solids in the coating composition.

The curing agent for the hydroxyl functional polyester is an aminoplast resin. Phenolplast resins are sometimes used to improve adhesion, especially over Zr treated aluminum.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Typically, the aminoplast is present in amounts of 5 to 25, such as 10 to 20 percent by weight, the percentages by weight being based on the weight of total resin solids in the coating composition. Amounts less than 5% provide insufficient cure whereas amounts greater than 25% provide coatings that are too brittle and that may volatilize in the curing oven.

Typically, the coating composition preferably will contain a diluent, such as an organic solvent, to dissolve or disperse the resinous materials. The organic solvent is selected to have sufficient volatility to evaporate essentially entirely from the coating composition during the curing process such as during a coil cure in which the metal is heated to 205-255° C. peak metal temperature for about 5 to 30 seconds. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. When present, the diluents are used in the coating compositions in amounts of about 55 to 85, such as 65 to 75 percent by weight based on total weight of the coating composition.

The phosphatized polyester is typically included in the coating composition and improves the adhesion of the coating composition to the substrate. The phosphatized polyester can be prepared by reacting a precursor polyester resin with a phosphorus acid. Suitable phosphatized polyesters are described in copending application Ser. No. 13/113,130 filed May 23, 2011.

The precursor polyester resin typically has a hydroxyl number of 20 to 75 mg KOH per gram of polyester resin and an acid value of 15 to 20 mg KOH per gram of polyester resin; each measured on a non-volatile solids basis.

The polyester resins have number average molecular weights (Mn) of 2,000 to 5,000 g/mole.

Suitable polyester resins are typically prepared as described above, that is, by condensation (esterification) according to known processes. The polyester resin is usually derived from a mixture of at least one polyfunctional alcohol (polyol), generally a mixture of diols and triols esterified with a polyacid. The polyacid component comprises an alpha, beta-ethylenically unsaturated polycarboxylic acid or anhydride.

The polyester resins are typically prepared from a mixture of the alpha, beta-ethylenically unsaturated polycarboxylic acid, usually with an aromatic and/or aliphatic polycarboxylic acid, and a polyol component, typically a mixture of a did and trial. The polyol and polycarboxylic acid are combined in desired proportions and chemically reacted using standard esterification (condensation) procedures to provide a polyester having both hydroxyl and carboxylic acid groups in the polyester resin. A trial is typically used to provide a branched, as opposed to linear, polyester.

Examples of suitable polycarboxylic acids or anhydrides include, but are not limited to, maleic anhydride, maleic acid, fumaric acid, itaconic acid, phthalic acid, phthalic anhydride, isophthalic acid, trimellitic anhydride, terephthalic acid, naphthalene dicarboxylic acid, adipic acid, azelaic acid, succinic acid, sebacic acid and various mixtures thereof.

When used, the aromatic and/or aliphatic polycarboxylic acid is used in amounts up to 70 percent by weight, typically 50 to 65 percent by weight based on total weight of the polycarboxylic acid or anhydride.

Examples of suitable dials, trials and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexane dimethanol, and polyethylene or polypropylene glycol.

As mentioned above, the polyol component is a mixture of a diol and a triol. The weight ratio of diol to triol typically ranges from 0.5 to 10 to 1.

The equivalent ratio of polyol component to polycarboxylic acid is from 0.9 to 1.1 to 1.0.

The phosphorus acid which is reacted with the polyester resin can be a phosphinic acid, a phosphonic acid or is preferably phosphoric acid. The phosphoric acid can be in the form of an aqueous solution, for example, an 85 percent by weight aqueous solution, or can be 100 percent phosphoric acid or super phosphoric acid. The acid is provided in amounts of about 0.2-0.5 equivalents of phosphoric acid per hydroxyl equivalent of the polyester resin, i.e., 0.2-0.45 P—OH groups per hydroxyl group.

The reaction of the phosphorus acid with the polyester resin is typically conducted in organic solvent. The organic solvent is typically an aromatic solvent, a ketone or an ester having a boiling point of about 65 to 250° C. Examples of suitable solvents include methyl ethyl ketone, methyl isobutyl ketone, butyl glycol acetate and methoxypropyl acetate. The organic solvent for the reaction is typically present in amounts of about 20 to 50 percent by weight based on total weight of phosphorus acid, polyester resin and organic solvent.

The reactants and the organic solvent are typically mixed at a temperature between 50° C. to 95° C. and once the reactants are contacted, the reaction mixture is maintained at a temperature preferably between 90° C. to 200° C. The reaction typically is allowed to proceed for a period of about 45 minutes to 6 hours.

The phosphatized polyester is used, typically in minor amounts, in a coating composition where it provides for improved adhesion of the resultant coating to the substrate. The phosphatized polyester is typically present in the coating composition in amounts of 0.1 to 20, such as 0.8 to 12, for example 3 to 12 percent by weight, based on weight of resin solids in the coating composition. Amounts less than 0.1 percent by weight result in inferior adhesion of the coating composition to the substrate where amounts greater than 20 percent by weight adversely affect adhesion.

Surfactants and flow additives can optionally be added to the coating composition to aid in flow and wetting of the substrate. Examples of suitable surfactants include, but are not limited to, nonyl phenol polyether and salts. Examples of suitable flow additives are those sold under the trademark DYNOADD from Dynea Industrial Coatings. If used, the surfactant or flow additive is present in amounts of at least 0.01 percent and no greater than 10 percent based on weight of resin solids in the coating composition.

In certain embodiments, the compositions used in the practice of the invention, are substantiality free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof are not intentionally added but may be present in trace amounts because of unavoidable contamination from the environment. The compositions can also be substantially free and may be essentially free and may be completely free of Bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds, derivatives or residues thereof.

The coating compositions of the present invention can be applied to containers of all sorts and are particularly well adapted for use on food and beverage cans (e.g., two-piece cans, three-piece cans, etc.). Besides food and beverage containers, the coating compositions can be applied to containers for aerosol applications such as deodorant and hair spray.

Two-piece cans are manufactured by joining a can body (typically a drawn metal body) with a can end (typically a drawn metal end). The coatings of the present invention are suitable for use in food or beverage contact situations and may be used on the inside or outside of such cans. They are suitable for spray applied, liquid coatings, wash coatings, sheet coatings, over varnish coatings and side seam coatings.

Spray coating includes the introduction of the coating composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is described as the coating, typically by a roll coating application, of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("DM") cans with a thin layer of protectant coating. The exterior of these D&I cans are "wash-coated" by passing preformed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets". Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

EXAMPLES

Test Methods

The following test methods were utilized in the Examples that follow,
- A. Blush Resistance: Blush resistance measures the ability of a coating to resist attack by various testing solutions. When the coated film absorbs test solution, it generally becomes cloudy or looks white. Blush is measured visually using a scale of 1-10 where a rating of "10" indicates no blush and a rating of "0" indicates complete whitening of the film. Blush ratings of at least 7 are typically desired for commercially viable coatings. The coated panel tested is 2×4 inches (5×10 cm) and the testing solution covers half of the panel being tested so you can compare blush of the exposed panel to the unexposed portion.
- B. Adhesion: Adhesion testing is performed to assess whether the coating adheres to the substrate. The adhesion test is performed according to ASTM D 3359-Test Method B, using Scotch 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on.
- C. Dowfax Detergent Test: The "Dowfax" test is designed to measure the resistance of a coating to a boiling detergent solution. The solution is prepared by mixing 5 grams of DOWFAX 2A1 (product of Dow Chemical) into 3000 grams of deionized water. Coated strips are immersed into the boiling Dowfax solution for 15 minutes. The strips are then rinsed and cooled in deionized water, dried, and immediately rated for blush as described previously.
- D. Joy Detergent Test: The "Joy" test is designed to measure the resistance of a coating to a hot 180° F. (82° C.) Joy detergent solution. The solution is prepared by mixing 30 grams of Ultra Joy Dishwashing Liquid (product of Procter & Garble) into 3000 grams of deionized water. Coated strips are immersed into the 180° F. (82° C.) Joy solution for 15 minutes. The strips are then rinsed and cooled in deionized water, dried, and immediately rated for blush as described previously.
- E. Acetic Acid Test: The "Acetic Acid" test is designed to measure the resistance of a coating to a boiling 3% acetic acid solution. The solution is prepared by mixing 90 grams of Glacial Acetic Acid (product of Fisher Scientific) into 3000 grams of deionized water. Coated strips are immersed into the boiling Acetic Acid solution for 30 minutes. The strips are then rinsed and cooled in deionized water, dried, and immediately rated for blush as described previously.
- F. Deionized Water Retort Test: The "DI Water Retort" test is designed to measure the resistance of a coating to deionized water. Coated strips are immersed into the deionized water and placed in a steam retort for 30 minutes at 250° F. (121° C.). The strips are then coded in deionized water, dried, and immediately rated for blush as described previously.
- G. Sol Fraction Test and film weight test (msi): Sol Fraction is a test designed to measure the degree of cure of a coating. If the panel is coated on both sides, remove the coating from the side of the panel not being tested. Punch out a four square inch disk in the hole puncher. Weigh disk on a four place balance. This is the "initial weight". Place samples into racks and soak in MEK (Methyl Ethyl Ketone) for 10 minutes. Remove samples and place into 400° F., (204° C.) oven for 2 minutes, remove, cool, and weigh again. This value is the "post bake weight". Next, place the disk into Sulfuric Acid (A298-212 Technical Grade available from Fisher Scientific) for 3 minutes to strip the coating from the metal. Rinse the panel with water to remove coating completely, dry panel and re-weigh. This is the "final weight". The equation used to determine Sol Fraction is:

$$\frac{\text{(Initial weight} - \text{Post Bake weight)}}{\text{(initial weight} - \text{Final weight)}} \times 100 = Sol \text{ Fraction}$$

The lower the number for Sol Fraction, the better the cure.

Film weight in milligrams/square inch (msi)=Initial weight (mg)−final weight (mg). Since disk is 4 square inches, divide by 4 to give the msi in mg/square inch.
- H. WACO Enamel Rater Test: The WACO Enamel Rater test determines the integrity of a fabricated can end by quantifying metal exposure. The end is secured by vacuum to the electrolyte-filled and electrode-containing end fixture. Fixture and specimen are inverted so that electrode and the product side of the end come into contact with the electrolyte solution and the edge of the sample contacts a metal chisel, completing the circuit. The instrument then applies a constant voltage (normally 6.3 VDC) across the coated surface and measures the resulting current at the industry standard of 4 seconds duration. The magnitude of the reading is directly proportional to the amount of exposed metal in the test sample. A low reading is desirable since that indicates there is very little exposed metal on the end. The ends produced for the experiments in this patent were B-64 type ends made on a Minster Press (Minster Machine Company of Minster, Ohio) and B-64 tooling designed by DRT Mfg. Co. of Dayton, Ohio.
- I. Liquor 85 Test Pack (L-85): A test solution similar to the original L-85 solution was used except with 10 times the original salt level. A stock solution is shown below:

| | |
|---|---|
| Deionized Water | 917.3 grams |
| Citric Acid | 92.0 grams |
| 85% Phosphoric Acid | 33.3 grams |
| Morton Salt (Sodium Chloride) with no iodine | 71.0 grams |

To the beverage can, measure out 47 grams of the above stock solution of L-85 and then add 308 grams of Sparkling Water (carbonated water). Then use a 202 type seamer to seam the end onto the can. The cans are then placed upside down (inverted) into a 100° F. (38° C.) incubator for a period of time (usually 6 or 7 days). Then remove the cans from the incubator, open them, and then measure Enamel raters (metal exposure) using the Waco Enamel rater test mentioned above. An acceptable enamel rater after L-85 pack testing are numbers which are less than 10 and preferably less than 5.

Illustrating the invention are the following examples that are not to be considered as limiting the invention to their details. All parts and percentages in the examples, as well as throughout the specification, are by weight unless otherwise indicated.

Example A

Polyester Polymer

|  | Name | Amount |
|---|---|---|
| Charge #1 | 2-Methyl 1,3-Propane Diol | 539.26 |
| Charge #2 | Butyl Titanate catalyst | 2.5 |
| Charge #3 | 2,6-Naphthalene dicarboxylic acid dimethyl ester | 883.76 |
| Charge #4 | Trimethylol Propane | 11.62 |
| Charge #5 | Isophthalic acid | 615.78 |
| Charge #6 | 2-Methyl 1,3-Propane Diol | 381.91 |
| Charge #7 | Adipic Acid | 331.95 |
| Charge #8 | Maleic Anhydride | 33.20 |
| Charge #9 | Stannous Octoate (catalyst) | 1.40 |
| Charge #10 | Aromatic 100 (aromatic diluent) | 147.40 |
| Charge #11 | Aromatic 100 | 612 |
| Charge #12 | 2-Butoxyethanol | 750 |
| Charge #13 | Methyl Ether Propylene Glycol Acetate | 490 |

1. Set reactor for packed column with head temperature and turn on condenser and nitrogen on sparge.
2. Charge #1, 2, 3, 4 to reactor. Heat reactor slowly to 160° C. (320° F.). Increase temperature accordingly maximum reactor temperature 245° C. (473° F.) not allowing column temperature to exceed 96° C. (205° F.). Maintain steady rate of distillation and process until material is clear and acid value of 5 or below.
3. Cool to 160° C. (320° F.).
4. Charge #5, 6, 7, 8 and 9 to reactor. Heat reactor to 200° C. (392° F.). Increase temperature accordingly maximum reactor temperature 245° C. (473° F.) not allowing column temperature to exceed 96° C. (206° F.). Maintain steady rate of distillation and process until material is clear and acid value of 20 or below.
5. Lower reactor temperature to 180° C. Pump Charge #10 to reactor. Set up azeotropic distillation over packed column filling the decanter with Aromatic 100. Increase temperature to maintain steady reflux maximum reactor temperature to not exceed 245° C.
6. Make in-process sample cuts in this ratio: 10 grams sample (@ 96% solids) from reactor with 7.32 grams of SZP-9406 to solids of 55%.
7. Process material until the Acid Value is 4.00 in solution and viscosity of $Z_{6+}$.
8. Lower temperature to 160° C. (320° F.) then begin adding Charge #11, 12 and 13 slowly let mix for 1 hour.
9. Filter through 5 micron bag.

The resulting number average molecular weight of this polyester was 12,063 and weight solids was 54.81%.

The mole % for the reactants was as follows:

|  | Mole % |
|---|---|
| 2-Methyl 1,3-Propane Diol | 50.47 |
| 2,6-naphthalene dicarboxylic acid dimethyl ester | 17.88 |
| Trimethyolpropane | 0.44 |
| Isophthalic Acid | 18.32 |
| Adipic Acid | 11.21 |
| Maleic Anhydride | 1.68 |

Example B

Comparative

Polyester Polymer

|  | Name | Amount |
|---|---|---|
| Charge #1 | 2-Methyl 1,3-Propane Diol | 370.44 |
| Charge #2 | Dibutyl tin oxide (catalyst) | 0.34 |
| Charge #3 | Terephthalic acid | 582.66 |
| Charge #4 | Ethylene glycol | 260.64 |
| Charge #5 | Adipic acid | 180.96 |
| Charge #6 | Trimethylol Propane | 22.28 |
| Charge #7 | Isophthalic acid | 582.66 |
| Charge #8 | Aromatic 150 | 489.42 |
| Charge #9 | Methyl Ether Propylene Glycol | 383.10 |
| Charge #10 | Propylene Carbonate | 817.28 |
| Charge #11 | Aromatic 150 | 674.6 |

1. Set reactor for packed column with head temperature and turn on condenser and nitrogen on sparge.
2. Charge #1, 2, 3, 4 and 5 to reactor. Heat reactor slowly to 160° C. (320° F.). Increase temperature accordingly maximum reactor temperature 245° C. (473° F.) not allowing column temperature to exceed 96° C. (205° F.). Maintain steady rate of distillation and process until material is clear and acid value of 3 or below.
3. Cool to 160° C. (320° F.).
4. Charge #6, 7 to reactor. Heat reactor to 200° C. (392° F.). Increase temperature accordingly maximum reactor temperature 245° C. (473° F.) not allowing column temperature to exceed 96° C. (205° F.). Maintain steady rate of distillation and process until material is clear and acid value of 20 or below.
5. Lower reactor temperature to 180° C. Pump Charge #8 to reactor. Set up azeotropic distillation over packed column filling the decanter with Aromatic 150. Increase temperature to maintain steady reflux maximum reactor temperature to not exceed 245° C.
6. Make in-process sample cuts in this ratio: 10 grams sample (@ 96% solids) from reactor with 14 grams of SZP-9406 to solids of 40%.
7. Process material until the Acid Value is 3 or below in solution and viscosity of Y+
8. Lower temperature to 160° C. (320° F.) then begin adding Charge #9, 10 and 11 slowly let mix for 1 hour.
9. Filter through 5 micron bag.

The resultant number average molecular weight of this polyester was 11,782 and weight solids was 43.92%.

The mole % for the reactants was as follows:

|  | Mole % |
|---|---|
| 2-Methyl 1,3-Propane Diol | 24.55 |
| Terephthalic Acid | 20.97 |
| Ethylene Glycol | 25.09 |
| Adipic Acid | 7.41 |
| Trimethylolpropane | 1.02 |
| Isophthalic Acid | 20.97 |

Example C

Polyester Polymer

A polyester polymer similar to Example A was prepared but substituting naphthalene dicarboxylic acid for the dimethyl ester.

The mole % for the reactants was as follows:

|  | Mole % |
|---|---|
| 2-Methyl 1,3-Propane Diol | 50.52 |
| 2,6-Naphthalene dicarboxylic acid | 17.86 |
| Trimethylolpropane | 0.41 |
| Isophthalic Acid | 18.32 |
| Adipic Acid | 11.23 |
| Maleic Anhydride | 1.66 |

Example D

Phosphatized Polyester

A phosphatized polyester resin was prepared from the following mixture of ingredients:

| Ingredient | Parts by Weight |
|---|---|
| 2-Methyl 1,3-Propane diol | 19.90 |
| Trimethylolpropane | 3.01 |
| Isophthalic acid | 14.35 |
| Dibutyl tin oxide (catalyst) | 0.06 |
| Maleic anhydride | 8.35 |
| Phthalic anhydride | 7.30 |
| Aromatic 100 | 7.79 |
| Phosphoric acid (85%) | 1.11 |
| Water | 0.08 |
| 2-Butoxyethanol | 4.26 |
| Monobutyl ether of diethylene glycol | 33.80 |

The first two ingredients were charged in a reaction vessel equipped with an agitator, a nitrogen blanket and a distillation set up and heated to 50° C. Once the temperature is reached then the next four ingredients were added to the vessel and slowly heated to distillation. The mixture was esterified under a nitrogen atmosphere over a period of about twelve (12) hours at a temperature ranging between 180° C. and 240° C. When the acid value of the mixture dropped to about 13.00 mg of KOH/g, the mixture was cooled to about 160° C. and then the AROMATIC 100 solvent (i.e., an aromatic hydrocarbon solvent blend commercially available from Exxon Mobil) was incorporated for azeotropic distillation of water evolved as a condensate by-product. Thereafter, the phosphoric acid solution and water were added and the azeotropic distillation of water was continued until the acid value of the mixture dropped to below 20 mg of KOH/g. The resulting phosphatized polyester resin was then dissolved in the 2-butoxyethanol and monobutyl ether of diethylene glycol to produce a composition which was about 50 percent by weight solids.

The number average molecular weight of the resulting phosphatized polyester was about 4,500, the acid value was about 20 and the hydroxyl value was about 80 based on resin solids. Weight solids was 54.07%. The equivalent ratio of P—OH to OH in the polyester was 1:2.3.

Coating compositions 1-5 were prepared by mixing together the ingredients shown in Table 1 below. Amounts are in parts by weight. The numbers within parenthesis are % by weight on a resin solids basis. Final theoretical weight solids of each of the examples is 32.28%.

TABLE 1

| Ingredients | Example 1 | Example 2 | Example 3 | Example 4 | Example 5 |
|---|---|---|---|---|---|
| (Polyester Resin) Example A | 48.24 | 50.32 |  |  |  |
| (Polyester Resin) Example B |  |  | 59.86 | 63.15 |  |
| (Polyester Resin) Example C |  |  |  |  | 47.21 |
| (Phos. Polyester) Example D | 2.39 |  | 2.39 |  | 2.39 |
| Maprenal BF 892/68B | 6.17 | 6.17 | 6.17 | 6.17 | 6.17 |
| Luba-Print 254/K-PM | 2.65 | 2.65 | 2.65 | 2.65 | 2.65 |
| Lanco TF1780 EF | 0.06 | 0.06 | 0.06 | 0.06 | 0.06 |
| Santosol DME Dibasic Ester | 11.4 | 11.57 | 7.81 | 7.06 | 12.43 |
| Methyl Ethyl Ketone | 6.32 | 6.32 | 4.53 | 4.53 | 6.32 |
| Methyl ether propylene glycol acetate | 5.64 | 5.64 | 4.04 | 4.04 | 5.64 |
| Aromatic 100 | 5.74 | 5.74 | 4.11 | 4.11 | 5.74 |
| Aromatic 150 | 11.16 | 11.16 | 8.00 | 8.00 | 11.16 |

Maprenal BF 892/68B is a butylated benzoguanamine crosslinker from Ineos.

Luba-Print 254/K-PM is a wax dispersion from Munzing.

Lanco TF1780 EF is a polyethylene wax from Lubrizol Corp.

Santosol DME-1 Dibasic Ester is from Cytec Industries, Inc.

Aromatic 100 an aromatic diluent from ExxonMobil Co.

Aromatic 150 an aromatic diluent from ExxonMobil Co.

Examples 1-5 were drawn down with a #24 wire wound bar over Cr treated aluminum (0.0082) to give 6.5-7.5 msi (milligrams/square inch), the targeted film thickness for interior beverage end coatings. A bisphenol A (BPA) epoxy control available from PPG Industries as G1 was also coated at this film thickness range as a control. The oven temperature was 630° F. (332° C.), dwell time 10 seconds to give a peak metal temperature of 450-465° F. (232-241° C.).

TABLE 2

| Example | Phosphatized Polyester Level on resin solids (Example D) | Polyester Resin Used | Coating weight (msi) | Joy Detergent Test (Blush) | Dowfax Detergent Test (Blush) | Acetic Acid Test (Blush) | Deionized Water Retort Test (Blush) | Sol Fraction | Sol Fraction after 4 weeks at 120° F. (49° C.) 80% humidity |
|---|---|---|---|---|---|---|---|---|---|
| G1 Control | N/A | N/A | 7 | 8 | 5 | 7 | 5 | N/A | N/A |
| 1 | 4 | Example A | 7.1 | 6.5 | 4.75 | 6.5 | 5 | 10.6 | 12.4 |
| 2 | 0 | Example A | 7.03 | 4.5 | 4.5 | 6 | 4.25 | 13.88 | 22 |
| 3 | 4 | Example B | 6.73 | 4.25 | 5 | 6.75 | 4.75 | 7.43 | 10.8 |
| 4 | 0 | Example B | 6.7 | 4 | 5 | 4.75 | 4 | 11.19 | 21.7 |

As can be seen from the test data in Table 2, the presence of the phosphatized polyester in Examples 1 and 3 improves bush resistance. Also, the presence of the phosphatized polyester in Examples 1 and 3 improves the Sol Fraction after 4 weeks at 120° F. (49° C.)/80% humidity. Examples 2 and 4 without the phosphatized polyester increased significantly in Sol Fraction after 4 weeks at 120° F. (49° C.)/80% humidity. The lower the Sol Fraction, the better the cure. So, this data indicates that without the phosphatized polyester, the cure drops significantly after humidity exposure.

The mole % for the reactants was as follows:

| | Mole % |
|---|---|
| 2-Methyl 1,3-Propane Diol | 50.62 |
| Trimethylolpropane | 0.17 |
| 2,6-Naphthalene dicarboxylic acid dimethyl ester | 17.93 |
| Isophthalic Acid | 18.34 |
| Adipic Acid | 11.28 |
| Maleic Anhydride | 1.66 |

TABLE 3

| Example | Phosphatized Polyester Level on resin solids (Example D) | Polyester Resin Used | Coating weight (msi) | Initial 6 Day L-85 Test Pack (Average Enamel Raters) | Flat Panel 4 wk 80% humidity at 120° F. (49° C.), then make ends and 6 Day L-85 Test Pack (Average Enamel Raters) | Flat Panel 4 wk 120° F. (49° C.) dry heat, then make ends and 6 Day L-85 Test Pack (Average Enamel Raters) |
|---|---|---|---|---|---|---|
| G1 Control | N/A | N/A | 7 | 2.88 | 4.1 | 6.2 |
| 1 | 4 | Example A | 7.1 | 3.48 | 2.1 | 3.1 |
| 3 | 4 | Example B | 6.73 | 18.5 | 500+ | 14.1 |
| 5 | 4 | Example C | 6.7 | 1.7 | 167.0 | 0.6 |

Table 3 shows average enamel raters after 6 day L-85 pack three different ways:

1. 6 day L-85 pack initial.
2. 6 day L-85 after storing the flat coated panels for 4 weeks at 120° F. (49° C.)/80% humidity, then making ends and doing L-85.
3. 6 day L-85 after storing the flat coated panels for 4 weeks at 120° F. (49° C.) dry, then making ends and doing L-85 pack.

Paint Example 1 utilizing Polyester Resin Example A performed equal or better than the control and was much superior to the polyester product in Example 3. It also performed better than Example 5 which utilized a polyester made with naphthalene dicarboxylic acid (diacid version).

Example E

Polyester Polymer

A polyester polymer similar to Example A was prepared but with an Mn of 10,580 and a resin solids content of 55.38%.

Example F

Polyester Polymer

A polyester polymer similar to Example A was prepared but with an Mn of 14,439 and a resin solids content of 53.95%.

The mole % for the reactants was as follows:

| | Mole % |
|---|---|
| 2-Methyl 1,3-Propane Diol | 50.42 |
| 2,6-Naphthalene dicarboxylic acid dimethyl ester | 17.89 |
| Trimethylolpropane | 0.44 |
| Isophthalic Acid | 18.34 |
| Adipic Acid | 11.22 |
| Maleic Anhydride | 1.68 |

Example G

Polyester Polymer

A polyester polymer similar to Example A was prepared but with an Mn of 12,826 and a resin solids content of 53.95%.

The mole % for the reactants was as follows:

| | Mole % |
|---|---|
| 2-Methyl 1,3-Propane Diol | 20.76 |
| Trimethylolpropane | 0.86 |
| Ethylene Glycol | 21.23 |
| Dimethyl Terephthalate | 17.73 |
| Isophthalic Acid | 24.46 |
| Adipic Acid | 14.96 |

Coating compositions 6-11 were prepared in the manner described for Examples 1-5 by mixing together the ingredients shown in Table 4 below. Amounts are in parts by weight.

TABLE 4

| Ingredients | Example 6 | Example 7 | Example 8 | Example 9 | Example 10 | Example 11 |
|---|---|---|---|---|---|---|
| (Polyester Resin) Example E | 47.75 | | | | | |
| (Polyester Resin) Example A | | 48.24 | | | | |
| (Polyester Resin) Example F | | | 49.15 | | | |
| (Polyester Resin) Example C | | | | 47.21 | | |
| (Polyester Resin) Example B | | | | | 58.02 | |
| (Polyester Resin) Example G | | | | | | 58.02 |
| (Phos. Polyester) Example D | 2.39 | 2.39 | 2.39 | 2.39 | 1.66 | 1.66 |
| Maprenal BF 892/68B | 6.17 | 6.17 | 6.17 | 6.17 | 7.71 | 7.71 |
| Phenodur PR 516/60B | | | | | 0.50 | 0.50 |
| Luba-Print 254/K-PM | 2.65 | 2.65 | 2.65 | 2.65 | 2.65 | 2.65 |
| Lanco TF1780 EF | 0.06 | 0.06 | 0.06 | 0.06 | 0.06 | 0.06 |
| Santosol DME Dibasic Ester | 11.9 | 11.4 | 10.5 | 12.43 | 8.48 | 8.48 |
| Methyl Ethyl Ketone | 6.32 | 6.32 | 6.32 | 6.32 | 4.53 | 4.53 |
| Methyl ether propylene glycol acetate | 5.64 | 5.64 | 5.64 | 5.64 | 4.04 | 4.04 |
| Aromatic 100 | 5.74 | 5.74 | 5.74 | 5.74 | 4.11 | 4.11 |
| Aromatic 150 | 11.16 | 11.16 | 11.16 | 11.16 | 8.00 | 8.00 |

Phenodur PR 516/60B is available from Cytec Industries, Inc.

Examples 6-11 were drawn down with a #24 wire wound bar over Zr treated aluminum (0.0082") to give 6.5-7.5 msi (milligrams/square inch), the targeted film thickness for interior beverage end coatings. The oven temperature was 630° F. (332° C.), dwell time 10 seconds to give a peak metal temperature of 450-465° F. (232-241° C.).

TABLE 5

| Example | Phosphatized Polyester Level on resin solids (Example D) | Mn | Polyester Resin | Flat Panel stored 8 weeks 100° F. (38° C.)/80% Humidity then make ends and 6 Day L-85 | Can ends stored 8 weeks 100° F. (38° C.)/80% Humidity then 6 Day L-85 |
|---|---|---|---|---|---|
| 6 | 4 | 10580 | Example E (Dimethylester of NDCA polyester) | 0.9 | 3.5 |
| 7 | 4 | 12063 | Example A (Dimethylester of NDCA polyester) | 2.3 | 8.1 |
| 8 | 4 | 14439 | Example F | 1.6 | 4.2 |
| 9 | 4 | 10688 | Example C | 49 | 2.3 |
| 10 | 2.8 | 11782 | Example B | 385 | 10.1 |
| 11 | 2.8 | 12826 | Example G | 42.5 | 5.8 |

From the data in Table 5, the molecular weight ladder of the polyesters of Examples 6-8 performed well for L-85 pack performance at all three Mn tested with the higher levels of phosphatized polyester. Acceptable performance is enamel raters less than 10 and preferably less than 5. The use of the dimethyl ester of naphthalene dicarboxylic acid based polyesters (Examples 6-8) eliminated the humid storage concerns.

For the paint examples shown in Table 6, amounts are shown in grams.

TABLE 6

| Ingredients | Example 12 | Example 13 | Example 14 |
|---|---|---|---|
| (Polyester Resin) Example A | 34.78 | | 34.92 |
| (Polyester Resin) Example B | | 38.67 | |
| (Phos. Polyester Adhesion Promoter) Example D | 0.39 | 0.36 | |
| Maprenal BF 892/68B | 4.52 | 4.25 | 4.54 |
| Microklear 116 | 0.10 | | 0.10 |
| Lanco TF 1780 EF | | 0.03 | |
| MD471 Michelman Dispersion 471 | | 0.88 | |

TABLE 6-continued

| Ingredients | Example 12 | Example 13 | Example 14 |
|---|---|---|---|
| Methylon 75108 | 0.74 | 0.68 | 0.74 |
| Dodecylbenzyl Sulfonic Acid Solution | 0.03 | 0.03 | 0.03 |

TABLE 6-continued

| Ingredients | Example 12 | Example 13 | Example 14 |
|---|---|---|---|
| Methyl Ether Propylene Glycol Acetate | 0.09 | 0.03 | 0.09 |
| Methyl Ethyl Ketone | 19.79 | 18.37 | 19.87 |

TABLE 6-continued

| Ingredients | Example 12 | Example 13 | Example 14 |
|---|---|---|---|
| Aromatic 100 | 19.77 | 18.33 | 19.85 |
| Diethylene Glycol Monobutyl Ether | 19.79 | 18.37 | 19.87 |

Maprenal BF 892/68B is a butylated benzoguanamine crosslinker from Ineos.
MicroKlear 116 is a PE/carnauba wax from Micropowders.
Methylon 75108 is a phenolic from Durez Co.
Dodecylbenzyl Sulfonic Acid Solution is a catalyst from Capital Resin Corp.
Aromatic 100 is from ExxonMobil Co.
Lanco TF 1780 EF is a PE wax from Lubrizol Corp.
MD471 Michelman Dispersion 471 is a carnauba wax from Michelman.

Examples 12 and 14 were drawn down with a #6 wire wound bar and Example 13 was drawn down with a #5 wire wound bar over Cr treated aluminum (0.0082) to give 1.5 msi (milligrams/square inch), the targeted film thickness for clear exterior draw-re-draw coatings. BPA epoxy control G1 from PPG Industries was also coated at this film thickness range as a control. The oven temperature was 630° F. (332° C.), dwell time 10 seconds to give a peak metal temperature of 450° F. (232° C.).

The coated metal was formed into a 1 inch diameter, 1.25 inch high cylindrical drawn cup by a 2-stage drawing process using an Erichsen model 224. In a steel beaker, the cups were submerged in a pH 9 buffer solution (4 g solution per 100 g DI water) and retorted at 250° F. (121° C.) 16 psi for 60 minutes. The cups were immediately rated for blush and adhesion using the ASTM rating system. The test was repeated with a pH 10 buffer solution (4 g solution per 100 g DI water).

| | 2$^{nd}$ Stage Erichsen Cup Retorted at 250° F. (121° C.) (16 psi) for 60 min. Submerged in pH 9 Buffer Solution | | 2$^{nd}$ Stage Erichsen Cup Retorted at 250° F. (121° C.) (16 psi) for 60 min. Submerged in pH 10 Buffer Solution | |
|---|---|---|---|---|
| Example | Blush | Adhesion | Blush | Adhesion |
| 12 | 9 | 10 | 8 | 10 |
| 13 | 9 | 10 | 7 | 10 |
| G1 | 4 | 10 | 4 | 10 |

Example 12 had better blush results than Example 13 and the G1 epoxy control.

The pH buffer retort testing was repeated on coating samples at room temperature and heat aged at 120° F. (49° C.) for 4 weeks.

| Example | 2$^{nd}$ Stage Erichsen Cup Retorted at 250° F. (121° C.) (16 psi) for 60 min Submerged in pH 9 Buffer Solution Blush | 2$^{nd}$ Stage Erichsen Cup Retorted at 250° F. (121° C.) (16 psi) for 60 min Submerged in pH 10 Buffer Solution Blush |
|---|---|---|
| 12 | 9 | 6.3 |
| 12 Heat Aged | 9 | 6.7 |
| 13 | 9 | 4.7 |
| 14 Heat Aged | 9 | 4.7 |

Example 12 at room temperature and heat aged had better blush results than Example 13 and Example 14 heat aged.

The invention claimed is:

1. A coated article comprising:
   (a) a metal container for food or beverages,
   (b) a cured coating applied to the interior surface of the container, the cured coating being derived from a liquid coating composition, wherein the coating composition is substantially free of bisphenol A and derivatives thereof, comprising:
      (A) 70 to 90 percent by weight of a hydroxyl functional polyester resin prepared from:
         (i) 1 to 8 mole percent of an alpha, beta-ethylenically unsaturated dicarboxylic acid containing from 4 to 5 carbon atoms,
         (ii) 10 to 30 mole percent of naphthalene dicarboxylic acid including lower alkyl esters thereof,
         (iii) 10 to 30 mole percent of an aromatic dicarboxylic acid different from (ii),
         (iv) 40 to 60 mole percent of an aliphatic diol containing branched alkyl groups, is free of neopentyl glycol, and
         (v) 0.2 to 4 mole percent of a triol,
         the mole percentages being based on total moles of (i)-(v);
      (B) 5 to 25 percent by weight of an aminoplast curing agent,
      (C) 0.1 to 20 percent by weight of a phosphatized polyester,
   (A), (B), and (C) being dissolved in organic solvent; the percentages by weight of (A), (B) and (C) being based on weight of resin solids in the coating composition and wherein the cured coating has a WACO Enamel Rater value less than 10 when tested according to the L-85 protocol.

2. The coated article of claim 1 in which (ii) is the lower alkyl ester.

3. The coated article of claim 1 in which the hydroxyl functional polyester resin has a number average molecular weight of 9,000 to 16,000 g/mole.

4. The coated article of claim 1 in which the hydroxyl functional polyester resin has a hydroxyl number less than 15.

5. The coated article of claim 1 in which the phosphatized polyester is present in amounts of 3 to 12 percent by weight based on weight of resin solids.

6. The coated article of claim 1 in which the phosphatized polyester comprises a reaction product comprising:
   (i) a polyester having an Mn of 2,000 to 5,000, a hydroxyl number of 20 to 75, and an acid value of 15 to 25; the polyester comprising a polycondensate of:
      (A) a polyol component comprising a mixture of diols and triols,
      (B) a polyacid component comprising an alpha, beta-ethylenically unsaturated polycarboxylic acid, and
   (ii) a phosphorus acid.

7. The coated article of claim 6 in which the polyol component comprises an aliphatic polyol optionally with alkyl branching.

8. The coated article of claim 6 in which the triol of the polyol component comprises trimethylolpropane.

9. The coated article of claim 6 in which the polyacid component comprises a mixture of an aliphatic and/or an aromatic polycarboxylic acid and an alpha, beta-ethylenically unsaturated polycarboxylic acid.

10. The coated article of claim 6 in which the alpha, beta-ethylenically unsaturated polycarboxylic acid of the polyacid component comprises maleic acid.

11. The coated article of claim 6 in which the phosphorus acid comprises phosphoric acid.

12. The coated article of claim 6 in which the phosphorus acid is used in amounts of 0.2 to 0.5 equivalents per equivalent of hydroxyl, that is, 0.2 to 0.5 P—OH for each hydroxyl.

13. The coated article of claim 1 in which the container is a can.

14. The coated article of claim 13 in which the coating composition is deposited on the interior walls of the can.

15. The coated article of claim 13 in which the container is a can end.

16. The coated article of claim 1 in which the coating composition (b) is completely free of bisphenol A and derivatives thereof.

17. The coated article of claim 1 in which the aliphatic diol containing branched alkyl groups is 2-methyl-1,3-propanediol.

18. The coated article of claim 1 in which the coating is cured by heating the metal to 205-255° C. peak metal temperature for about 5 to 30 seconds.

\* \* \* \* \*